(12) United States Patent
Kaku

(10) Patent No.: US 6,903,778 B1
(45) Date of Patent: Jun. 7, 2005

(54) ELECTRONIC CAMERA

(75) Inventor: Junya Kaku, Itami (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/420,507

(22) Filed: Oct. 19, 1999

(30) Foreign Application Priority Data

Oct. 19, 1998 (JP) .......................................... 10-296997

(51) Int. Cl.⁷ ........................ H04N 5/225; H04N 5/222
(52) U.S. Cl. .............................. 348/372; 348/333.13
(58) Field of Search .................... 348/333.01, 333.13, 348/220.1, 231.99, 231.1, 231.9, 372, 374; 386/38, 117, 120; 358/909.1

(56) References Cited

U.S. PATENT DOCUMENTS

| | | | | |
|---|---|---|---|---|
| 4,546,390 A | * | 10/1985 | Konishi et al. | 348/220.1 |
| 5,206,730 A | * | 4/1993 | Sakai | 348/220.1 |
| 5,262,868 A | * | 11/1993 | Kaneko et al. | 348/231.9 |
| 5,640,203 A | * | 6/1997 | Wakui | 386/120 |
| 6,188,432 B1 | * | 2/2001 | Ejima | 348/374 |
| 6,208,380 B1 | * | 3/2001 | Misawa | 348/231.9 |

FOREIGN PATENT DOCUMENTS

| | | |
|---|---|---|
| JP | 6-22262 | 1/1994 |
| JP | 9-33981 | 2/1997 |

* cited by examiner

Primary Examiner—Wendy R. Garber
Assistant Examiner—Luong T. Nguyen
(74) Attorney, Agent, or Firm—Armstrong, Kratz, Quintos, Hanson & Brooks, LLP

(57) ABSTRACT

An electronic camera includes a mode change switch. This mode change switch selects a still image recording mode to record 1 scene of an image signal to a recording medium, and a continuous image recording mode to record a plurality of scenes of continuous image signals to the memory medium. In the still recording mode, an battery remaining capacity goes below 5%, the shutter button is disabled in operation. In the continuous image recording mode, when the battery remaining capacity goes below 25%, the shutter button is disabled in operation. These threshold values are related to a consumed power required for recording the image signal taken in each of the modes.

7 Claims, 6 Drawing Sheets

ELECTRONIC CAMERA

BACKGROUND OF THE INVENTION

1. Field of the Invention

This invention relates to electronic cameras and, more particularly, to an electronic camera provided with a still image recording mode to record one scene of image information and a continuous image recording mode to record a plurality of scenes of image obtained in a continuous fashion, such as in successive or motion image recording.

2. Description of the Prior Art

The electronic cameras for recording still images taken by an image sensor such as a CCD imager into a recording medium, such as a memory card, use a battery as a power source. Accordingly, in the conventional electronic cameras there has been a necessity to always grasp a battery remaining capacity based on an output voltage of the battery so that an operator can be notified of replacing the battery when its remaining capacity becomes insufficient. Also, when the battery voltage goes below a previously-set lower limit due to a considerable reduction in remaining capacity, it has been a practice to prohibit taken still images from being recorded or to forcibly turn off a power to a camera main body.

Meanwhile, in recent years there has been developed an electronic camera prepared with not only a still image recording mode but also a continuous image recording mode. Here, the continuous image recording mode includes a successive shot recording mode to create within a recording medium a still image file separately accommodating a plurality of still images sequentially obtained during depressing the shutter button, and a motion image recording mode to create within a recording medium a motion image file collectively accommodating a plurality of still images sequentially obtained during depressing the shutter button. However, there is no significant difference between the successive shot recording mode and the motion image recording mode in that a plurality of scenes of images taken by an image sensor are stored on a recording medium. However, the above battery remaining capacity control is adopted, as it is, to an electronic camera having both still image and continuous image recording modes, the following problem will result.

That is, the previously-set lower limit has such a value as to merely assure the operation from shooting one still image up to recording a corresponding still image signal to a recording medium. In the case that, for example, successive 100 shots are taken in a successive shot recording mode, if the battery voltage is as low as slightly above the lower limit value, the battery voltage will go below the lower limit value at a time that a first still image signal is recorded into the memory medium, thus making impossible to record the remaining still image signals. Also, in a certain case, the power to the camera main body has to be forcibly turned off, thus making difficult to complete a successive shot recording mode. Such a problem is true for operation in the motion image recording mode.

SUMMARY OF THE INVENTION

It is therefore a primary object of the present invention to provide an electronic camera which is capable of properly recording shot images both in a still image recording mode and continuous image recording mode.

According to the present invention, an electronic camera to be driven by a battery, comprising: an instruction key for instructing for picture taking; a picture taking means for taking a subject image at least 1 scene in response to operation of the instruction key; a processing means for performing signal processing on a camera signal corresponding to the subject image taken by the picture taking means and creating an image signal; a recording means for recording the image signal created by the processing means to a recording medium; a comparison means for comparing a remaining capacity of the battery with a predetermined threshold value; a disabling means for disabling the instruction key depending upon a result of comparison by the comparing means; a select means for selecting either one of a still image recording mode to picture taking a 1-scene subject image in response to once operating the instruction key and recording the 1-scene image signal to the recording medium, and a continuous image recording mode to picture taking a plurality of scenes of subject images in response to once operating the instruction key and recording the plurality of scenes of image signals to the recording medium; a first enabling means for enabling a first threshold value related to a consumed power required for recording a 1-scene image signal when the still image recording mode is selected; and a second enabling means for enabling a second threshold value related to a consumed power required for recording the plurality of scenes of image signals when the continuous image recording mode is selected.

In a state that a still image recording mode is selected, if the instruction key is operated, the picture taking means takes 1 scene of a subject image. The processing means performs signal processing on a 1-scene camera signal corresponding to the taken subject image, and creates a 1-scene image signal. The created 1-scene image signal is recorded to a recording medium by the recording means. On the other hand, in a state that a continuous image recording mode is selected, if the instruction key is operated, the picture taking means takes a plurality of scenes of subject images. The subject images are signal-processed by the processing means. A plurality of scenes of image signals thus obtained are recorded to a recording medium by the recording means.

A remaining capacity of the battery is compared with a predetermined threshold value by a comparison means. In a still image recording mode a first threshold value is used for comparison, while in a continuous image recording mode a second threshold value is used for comparison. Here, the first threshold value is related to a consumed power required for recording a 1-scene image signal, while the second threshold value to a consumed power required for recording a plurality of scenes of image signals. If a predetermined comparison result is obtained by the comparison means, the instruction key is disabled by a disabling means.

According to the present invention, a threshold value is enabled depending upon a recording mode. Accordingly, in any of still image and continuous image recording modes, shot subject images can be properly recorded.

In one aspect of the invention, the recording process is performed as follows. First, the image signal processed by the processing means is stored into the internal memory by the storing means. If a plurality of scenes of image signals are stored in the internal memory, the write means writes the predetermined number of scenes of image signals to a recording medium. Here, the predetermined number of scenes is related to a recording mode selected by the select means.

In another aspect of the invention, the continuous image mode includes a motion image recording mode and successive shot recording mode. In the motion image recording mode, a first number of scenes of motion images are taken in response to once operating the instruction key to record the first number of scenes of image signals to the recording medium. In the successive shot recording mode, still images in a second number of scenes less than the first number of scenes are taken in response to once operating the instruction key to record the second number of scenes of image signals to the recording medium. The processing means creates image signals of a first resolution when a motion image recording mode is selected, and image signals of a second resolution higher than the first resolution when a successive shot recording mode is selected. Here, the second threshold value assumes a common value in between the motion image recording mode and the successive shot recording mode.

In still another aspect of the invention, where a predetermined comparison result is obtained, a character indicative of not-recordable is displayed.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
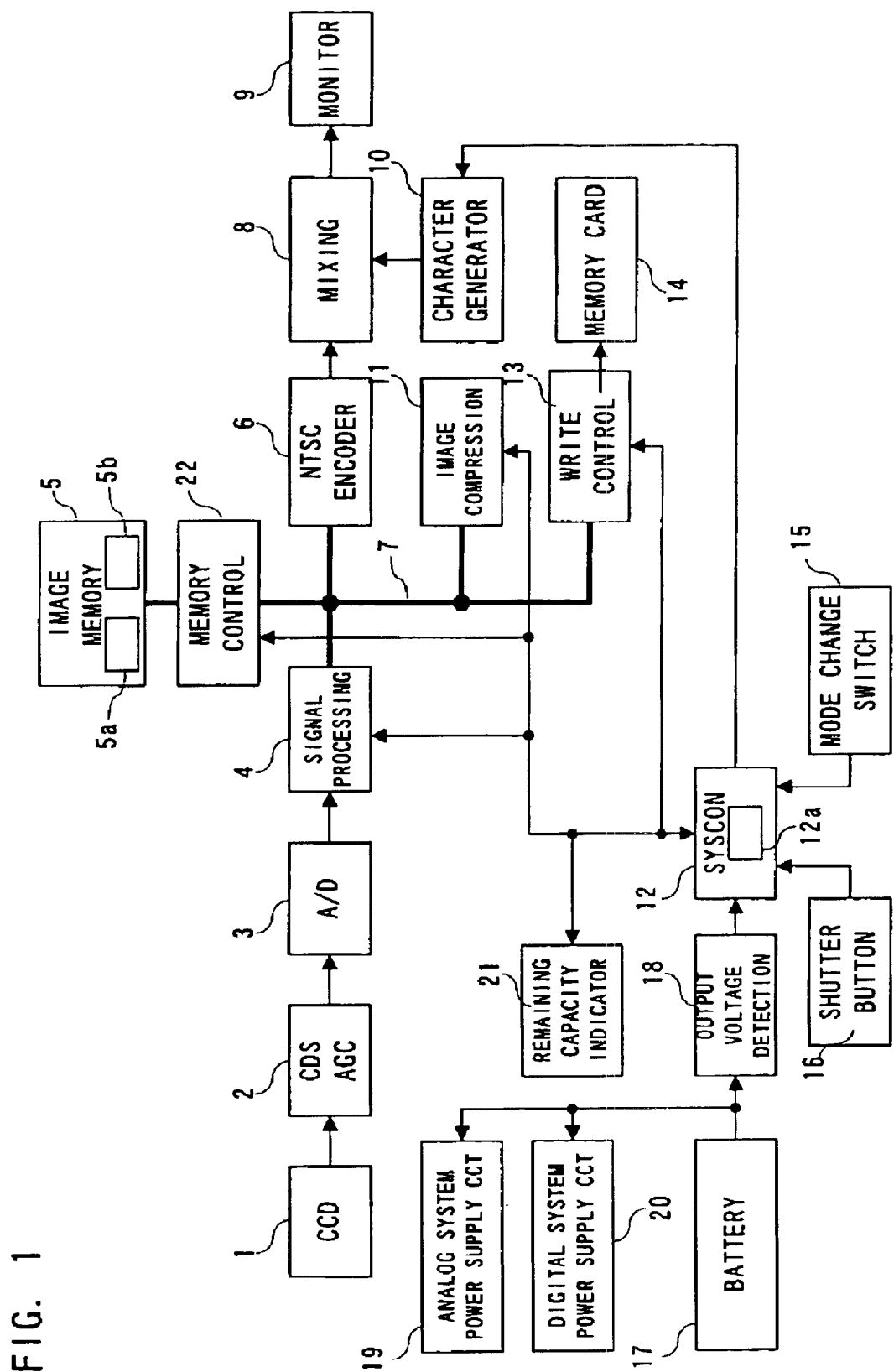
FIG. 1 is a block diagram showing one embodiment of the present invention.

Referring to FIG. 1, an electronic camera of this embodiment includes a CCD imager 1. The CCD imager 1 takes through a lens (not shown) a subject image, and photoelectrically converts it into a camera signal. The camera signal outputted from this CCD imager 1 is subjected to well-known noise removal and level adjustment by a CDS/AGC circuit 2 and then converted into camera data as a digital signal by an A/D converter 3. A signal processing circuit 4 at the following stage performs well-known signal processing, say color separation and YUV conversion, on the camera data thereby creating image data comprising luminance data and two kinds of chrominance data. The created image data is delivered through a bus 7 to a memory control circuit 22. The image data is stored by a memory control circuit 22 into an image data storage area 5a of an image memory 5.

Figure 6:
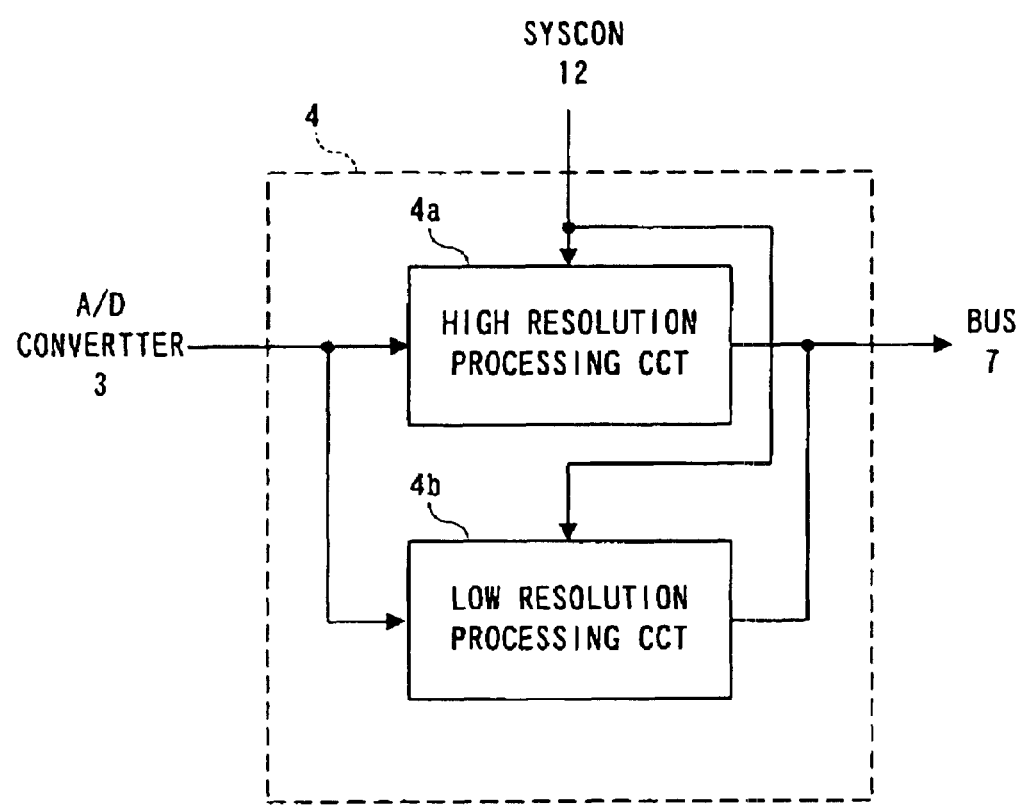
FIG. 6 is a block diagram showing one part of the FIG. 1 embodiment.

Referring to FIG. 6, the signal processing circuit 4 includes a high resolution signal processing circuit 4a and a lower resolution signal processing circuit 4b. The high resolution signal processing circuit 4a performs color separation and YUV conversion processes on the camera data, and outputs image data of a VGA size (640×480 pixels), i.e. with high resolution. On the other hand, the low resolution signal processing circuit 4b subjects the camera data to a thinning-out process and then color separation and YUV conversion processes, and outputs image data of a QVGA size (320×240 pixels), i.e. with low resolution. The high resolution signal processing circuit 4a and low resolution signal processing circuit 4b thus configured are selectively enabled by an instruction given from a system controller 12.

The memory control circuit 22 reads out image data stored in the image data storage area 5a, and inputs it through the bus 7 to an NTSC encoder 6. The NTSC encoder 6 encodes the inputted image data with an NTSC format, and supplies an obtained composite image signal to a monitor 9 through a mixer 8. As a result, motion images (through-images) of a subject are displayed real time on the monitor.

When a character generator 10 outputs a character signal indicative of not-recordable, the mixer 8 mixes this character signal with the composite image signal. Dut to this, when a character signal is mixed, a corresponding character is OSD-displayed on the monitor 9.

Receiving a compression instruction from the system controller 12, an image compression circuit 11 fetches the image data stored in the image data storage area 5a through the bus 7 and performs a compression process on the fetched image data in a manner conforming to a JPEG format. Furthermore, the compressed image data created by compression is stored into a compressed data storage area 5b of the image memory 5 through the bus 7. It is noted that the image data storage area 5a and the compressed data storage area 5b are provided in separate sites within the image memory 5.

Receiving a write command from the system controller 12, a write control circuit 13 records 1 scene of compressed image data stored in the compressed data storage area 5b onto a memory card 14.

A mode change switch 15 is selectable by user's manual operation to any of a still image recording mode, a successive shot recording mode and a motion image recording mode. The mode selected herein is inputted as a mode selection signal to the system controller 12.

A battery 17 is formed by a plurality of cells, which in a fully charged state generates a voltage of 6V. The output voltage of the battery 17 is supplied to an analog system power supply circuit 19, a digital system power supply circuit 20 and an output voltage detection circuit 18. The analog system power supply circuit 19 supplies a drive voltage to a block that performs analog-schemed signal processing, such as drive circuit to the CCD imager 1 and CDS/AGC circuit 2. Specifically, the analog system power supply circuit 19 is configured by a DC/DC converter to shift a 3V battery voltage to a plurality of DC voltage levels required by the respective processing circuits.

The digital system power supply circuit 20 supplies drive voltage to blocks for effecting digital data signal processing, including the signal processing circuit 4 and image compression circuit 11. Similarly to the analog system power supply circuit 19, the digital system power supply circuit 20 is also configured by a DC/DC converter to output a plurality of DC voltage levels required by the respective processing circuits. Meanwhile, the output voltage detection circuit 18 detects a value of an output voltage of the battery 17, and notifies a detected battery voltage value to the system controller 12.

The system controller 12 receives a mode select signal inputted from the mode change switch 15 and enables a required circuit in a desired mode. Furthermore, the system controller 12 executes a picture taking process in a manner suited for each mode, in response to operation of the shutter button 16. The system controller 12 also compares a battery voltage value detected by an output voltage detecting circuit 18 with a plurality of previously-set threshold values. Based on a result of this comparison, the system controller 12 instructs the remaining capacity indication device 21 to indicate a battery remaining capacity and the character generator 10 to output a character signal. Incidentally, a liquid crystal display is applied as the remaining capacity indication device 21, which is arranged on a top surface of a camera main body.

Figure 2:
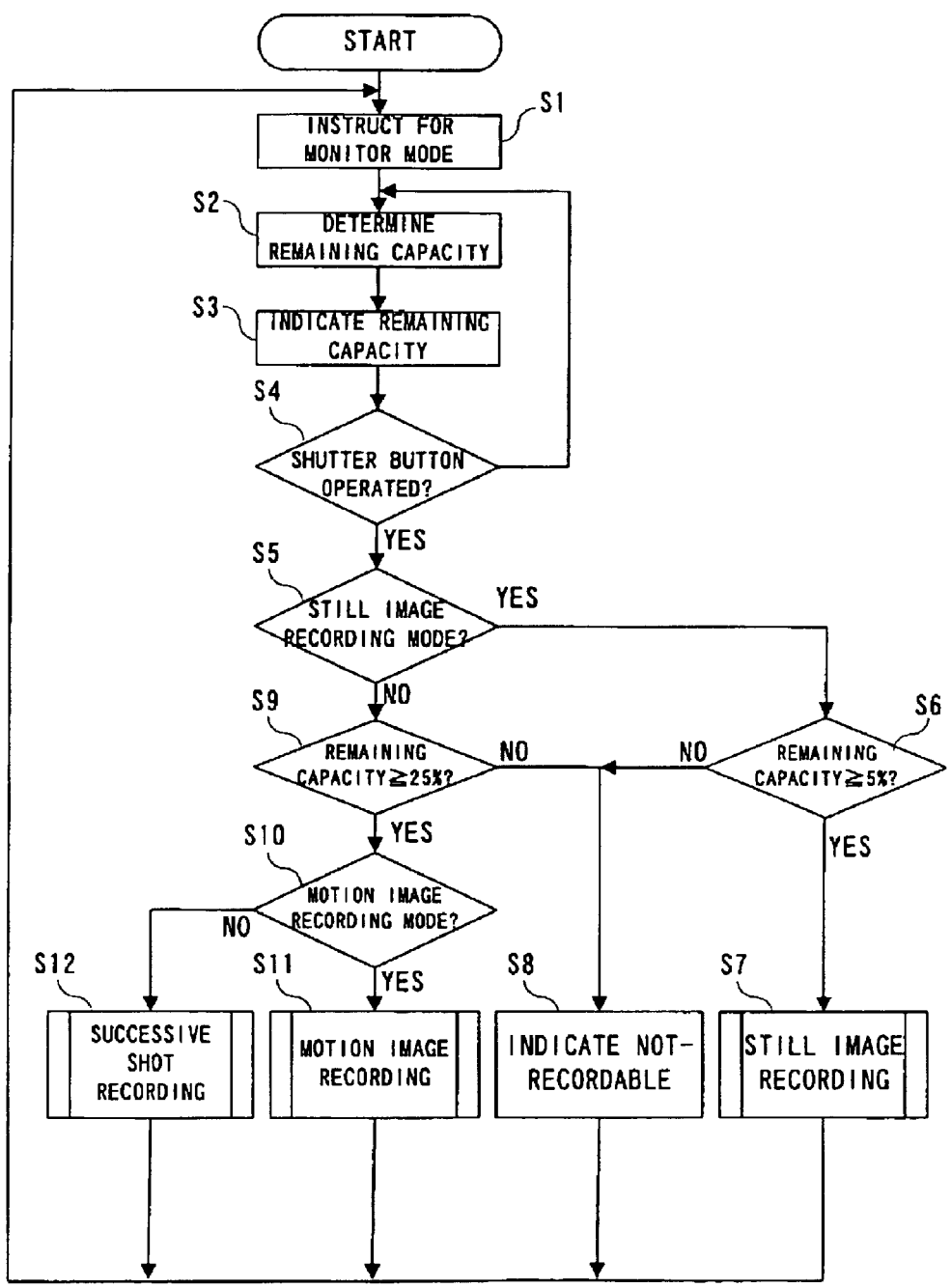
FIG. 2 is a flowchart showing one part of operation in the FIG. 1 embodiment.

The system controller 12 concretely processes a flowchart shown in FIG. 2. Incidentally, when the camera power button (not shown) is turned on, a voltage is applied from the battery 17 to the analog system power supply circuit 19 and digital system power supply circuit 20, thus starting the flowchart process.

The system controller 12 first in step S1 executes a monitor mode process. Due to this, a subject image is shot by the CCD imager 1 so that the corresponding camera data is converted by the low resolution signal processing circuit 4b into low resolution image data. The converted image data is once stored in the image data storage area 5a, and thereafter outputted to the NTSC encoder 6. The NTSC encoder 6 creates a composite image signal based on the inputted image data, and outputs a created composite image signal to the monitor 9 through the mixer 8. As a result, motion images are displayed in real time on the monitor 9.

It is noted that in a monitor mode no character signal output command is issued from the system controller 12 to the character generator 10. Further, no OSD-display is made of a character indicative of not recordable in the monitor 9. In the monitor mode, the system controller 12 does not issue neither a compression command nor a write command so that the image compression circuit 11 and write circuit 13 will not operate. Accordingly, motion images are merely displayed on the monitor 9 without recorded to the memory card 14.

The system controller 12 subsequently proceeds to step S2 to determine a remaining capacity of the battery 17 based on a battery voltage value obtained from the output voltage detection circuit 18. Specifically, the battery voltage value is compared with previously set thresholds R1, R2 and R3 to thereby determine how the battery voltage value is related to each threshold. Here, the threshold R1 corresponds to a remaining battery voltage of 50% of the fully charged capacity, the threshold R2 to a remaining battery voltage of 25% of the fully charged capacity, and threshold R3 is to a remaining battery voltage of 5% of the fully charged capacity. These are previously determined based on experimental actual values.

In connection to the relation between a battery voltage Vb and each of threshold R1, R2 and R3, when Vb≧R1, determination is as a first remaining capacity state sufficient in remaining capacity. When R1>Vb≧R2, determination is as a second remaining capacity state wherein the remaining capacity is less than 50% but more than 25%. Also, when R2>Vb≧R3, determination is as a third remaining capacity state wherein the remaining capacity is less than 25% but more than 5%. When R3>Vb, determination is as a fourth remaining capacity state wherein the remaining capacity is less than 5%, or nearly zero.

Incidentally, it requires at least a battery remaining capacity of 5% to shot one still image and record the shot still image (high resolution image data) to the memory card 14. Also, it requires a battery remaining capacity of at least 25% to shoot motion images including still images of m (m: plurality) in number and record these motion images (low resolution image data) to the memory card 14. It requires a battery remaining capacity of at least 25% to successively shot still images of n (n: plurality) in number and record these still images (high resolution image data) of n in number into the memory card 14.

Completing the battery remaining capacity determination process in the step S2, the system controller 12 advances to step S3 where it instructs the remaining capacity indication device 11 to indicate a determined remaining capacity state. As a result, the operator can recognize a remaining capacity of the battery 17 from the remaining capacity indication device 21.

The system controller 12 subsequently determines in step S4 whether the shutter button 16 has been operated or not. If no operation has been made on the shutter button 16, the system controller 12 returns to the step S2 to repeat the above series of processes. On the other hand, if the shutter button 16 has been operated, the system controller 12 moves to step S5 to determine, based on a mode select signal from the mode change switch 15, whether selected is a still image recording mode or a continuous image recording mode such as a successive shot recording mode or motion image recording mode.

Where a still image recording mode is selected, the system controller 12 advances from the step S5 to step S6 to determine whether the battery remaining capacity is higher than 5% or not. That is, it is determined whether the determination result of step S2 is in a first remaining capacity state or a third remaining capacity state. Here, if the determination result is either one of a first remaining capacity state or a third remaining capacity state, there is a battery remaining capacity that can afford to execute a series of processes including picture taking one sheet of still image and record it to the memory card 14. Consequently, the system controller 12 in step S7 executes a still image recording mode process according to a subroutine shown in FIG. 3.

Figure 3:
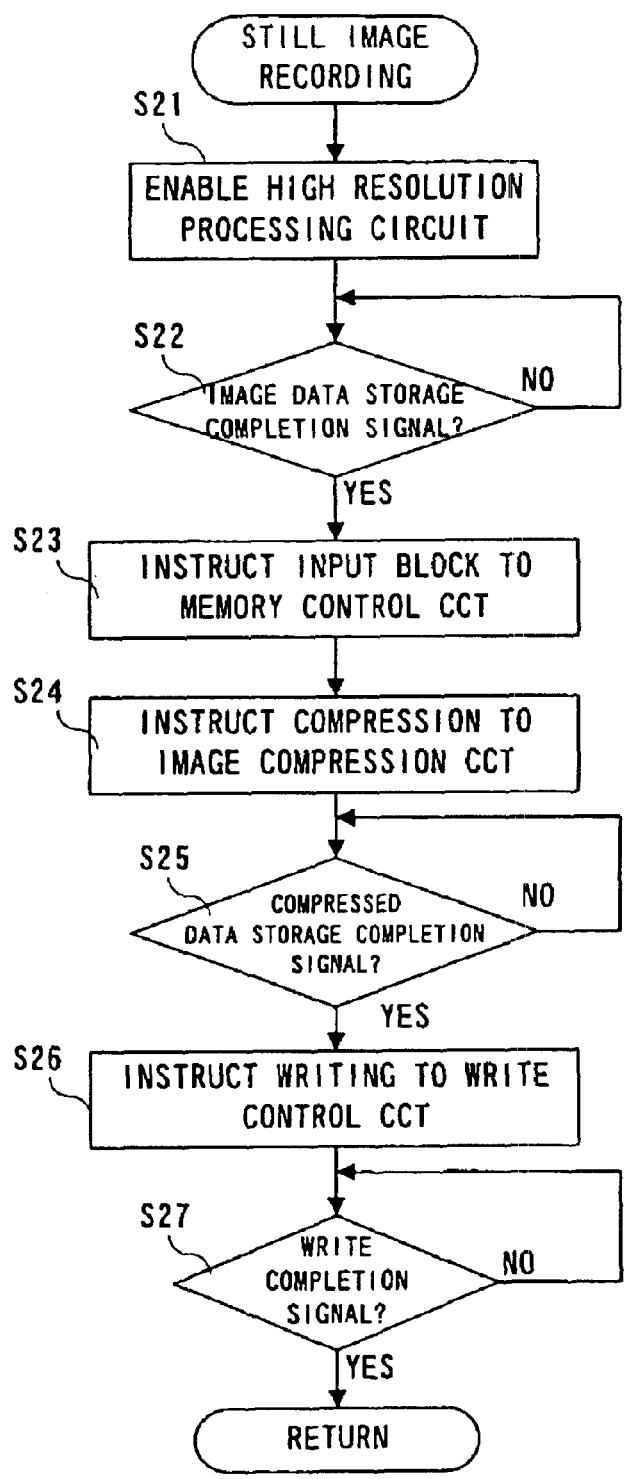
FIG. 3 is a flowchart showing another part of operation in the FIG. 1 embodiment.

Referring to FIG. 3, the system controller 12 first in step S21 enables the high resolution signal processing circuit 4a. Due to this, the camera data of a subject image taken by the CCD imager 1 is converted into image data without subjected to thinning-out. The converted image data is stored into the image data storage area 5a of the image memory 5. After completing the storage of 1 scene, or 1 frame, of image data after operating the shutter button 16, the memory control circuit 22 outputs image data storage completion signal to the system controller 12.

Due to this, the system controller 12, when a image data storage completion signal was outputted in step S22, proceeds to step S23 to instruct the memory control circuit 22 to block against input of image data to be newly created by a signal processing circuit 4. The system controller 12 further in step S24 issues a compression command to the image compression circuit 11. When a compression command is issued, the image compression circuit 11 fetches the image data stored in the image data storage area 5a and compresses it, and stores compressed image data into the compressed data storage area 5b of the image memory 5. If 1-frame compressed image data is obtained within the image memory 5 in this manner, a compressed data storage completion signal is inputted from the memory control circuit 22 to the system controller 12.

The system controller 12, when given a compressed data storage completion signal, determines "YES" in step S25, and in step S26 issues a write command to the write control circuit 13. The write control circuit 13 responds to the write command and creates within the memory card 14 a still image file accommodating the compressed image data. After recording the still image file in the memory card 14, the write control circuit 13 sends back a write completion signal to system controller 12. Inputted by the write completion signal from the write control circuit 13, the system controller 12 in step S27 determines "YES" and then returns to the main routine, i.e., to the step S1.

Because a monitor mode process is executed in the step S1, in the signal processing circuit 4 the low resolution signal processing circuit 4b is again enabled. Also, the memory control circuit 22 stores the image data outputted from the signal processing circuit 4 into the image data storage area 5a, and the NTSC encoder 6 creates a composite image signal based on the image data stored in the image data storage area 5a. On the other hand, the image compression circuit 11 and write control circuit 13 are disabled. As a result, subject motion images are displayed on the monitor 9.

Incidentally, in the still image recording mode the image data in the image data storage area 5a is suspended from being updated. Accordingly, on the monitor 9 is displayed an image (freeze image) corresponding to the image data stored in the image data storage area 5a. At this time, no character signal output command is issued from the system controller 12 and hence a not-recordable character is not OSD-displayed.

When it is determined in the step S6 that the battery remaining capacity is less than 5%, i.e. when the determination result in the step S2 shows a fourth remaining capacity state, it not be assured to execute the process covering picture taking a still image and recording it onto the memory card 14. At this time, the system controller 12 moves to step S8 where it issues a character signal output command to the character generator 10 in order to display character indicative of not-recordable on the monitor 9. The character generator 10 receives is output command and supplies a character signal indicative of not-recordable to the mixer 8. The mixer 8 superimposes this character signal over a composite image signal obtained from the encoder 6 in the monitor mode, thereby providing OSD-display of a corresponding character on the monitor 9. After ending the process of step S8, the system controller 12 returns to the step S1.

When a not-recordable display process is effected in the step S8, the still image recording process of the step S7 will not be executed. That is, despite the shutter button 16 has been depressed, the process is not executed that includes taking still image up to recording same. In other words, if "NO" is determined in the step S6, the shutter button is disabled in operation. By not-recordable display is made on the monitor 9, the operator can recognize that still image recording is impossible due to an insufficient remaining capacity and the shutter button 16 is disabled in operation because of this cause.

When it is determined in the step S5 that either one of a motion image recording mode or a successive shot recording mode is selected, the system controller 12 in step S9 determines whether the remaining capacity is more than 25%, e.g. whether or not the determination result in the step S2 shows a first remaining capacity state or second remaining capacity state.

If the determination result is a first or second remaining capacity state, there is a sufficient battery remaining capacity for recording m sheets of image data in the motion image recording mode, or m frames of low resolution image data, into the memory card 14. That is, it is assured in the motion image recording mode to record motion images with a maximum shotable number of m in number. Similarly, there exists a sufficient battery capacity in the successive shot recording mode to record onto a memory card 14 n sheets of image data, or n frames of high resolution image data. Thus, it is assured to record in the successive shot recording mode to record still images with a maximum shotable number of n.

Due to this, when it is determined in step S9 that the remaining capacity is more than 25%, the system controller 12 moves to step S10 to determine which one is selected of a motion image recording mode and a successive shot recording mode.

Figure 4:
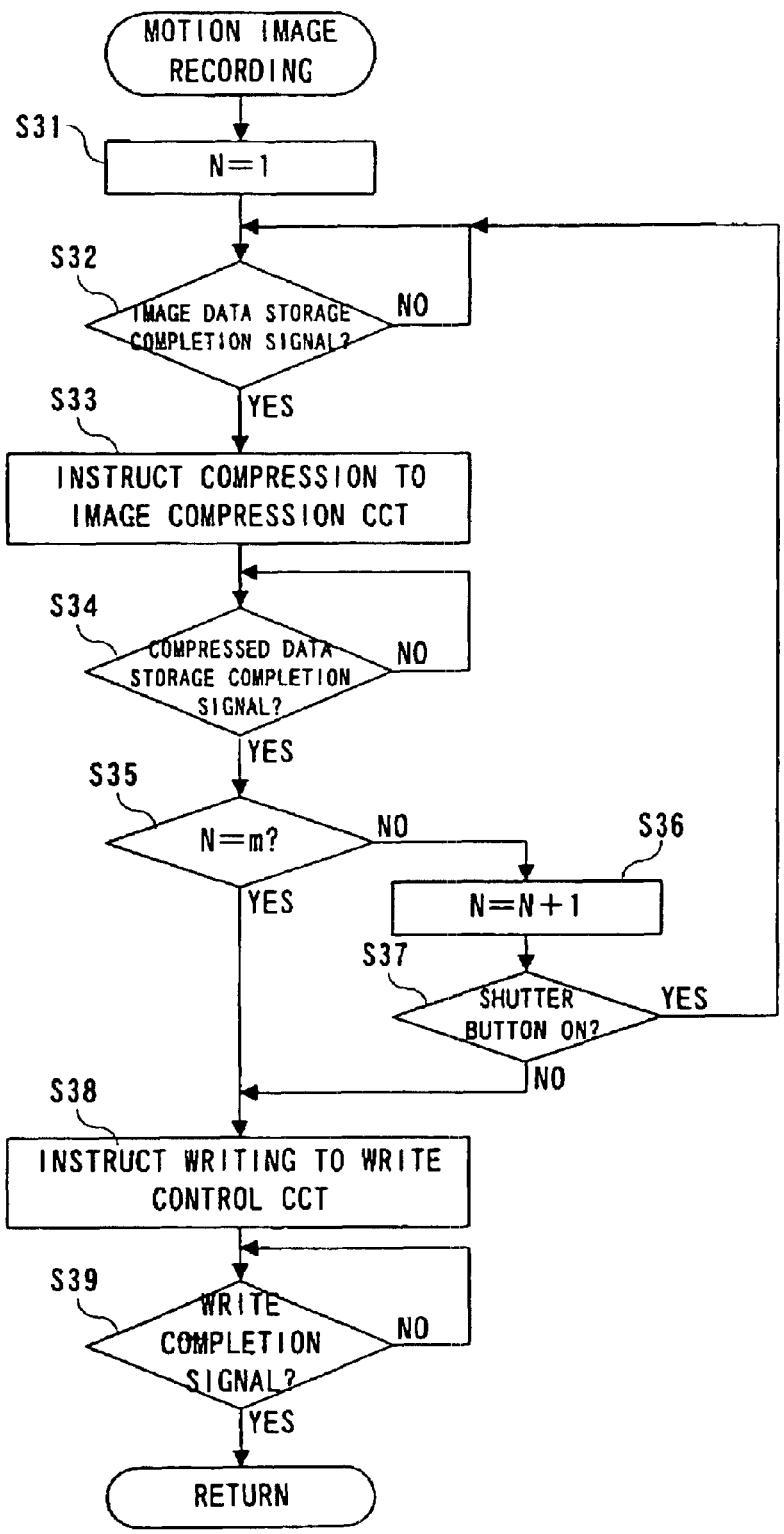
FIG. 4 is a flowchart showing still another part of operation in the FIG. 1 embodiment.

When it is determined in step S10 that a motion image recording mode is selected, the system controller 12 in step S11 executes a subroutine shown in FIG. 4. It is noted that subroutine includes many of common process to those of the subroutine of FIG. 3, and explanations are mainly on the different processes to omit explanations of the common processes.

In the first step S31 a count value N of an image counter 12a is initialized to 1. In the following steps S32–S34, the same processes as those of the above steps S22, S24 and S25 are performed. Incidentally, this recording mode is to record motion images, and wherein no input block command is given to the memory control circuit 22.

In step S35 it is determined whether the count value N have reached a maximum shotable number m or not, i.e. the image no. recorded in the memory card 14 have reached a maximum shotable number m or not. If N=m here, the process advances to step S38, while if N<m, it is considered that recording is possible and hence the process advances to step S36. In the step S36 the image counter 12a is incremented, and in the following step S37 it is determined whether the shutter button 16 is still in an on-state or not. If the shutter button 16 is in an off-state, the process proceeds to step S38, while if the shutter button 16 is in an on-state the process returns to the step S32. The memory control circuit 22 continues to store the following input image data to the storage area 5a, and generates an image data storage completion signal each time 1 scene has been stored. Accordingly, the above process is repeated until N=m or a shutter button 16 off-state is reached.

In the step S38 and the subsequent step S39, the same process is carried out as those of the steps S26 and S27. However, the write control circuit 13 creates a motion image file within the memory card 14 in response to a write command issued in the step S38, and accommodates therein a plurality of screens of compressed image data. That is, a plurality of scenes of motion image data are accommodated in the motion image file. The write control circuit 13 further records an image number (count value N) of each compressed image data to a header of this motion image file. Incidentally, those to be accommodated in a motion image file in the motion image recording mode are low resolution compressed image data.

Figure 5:
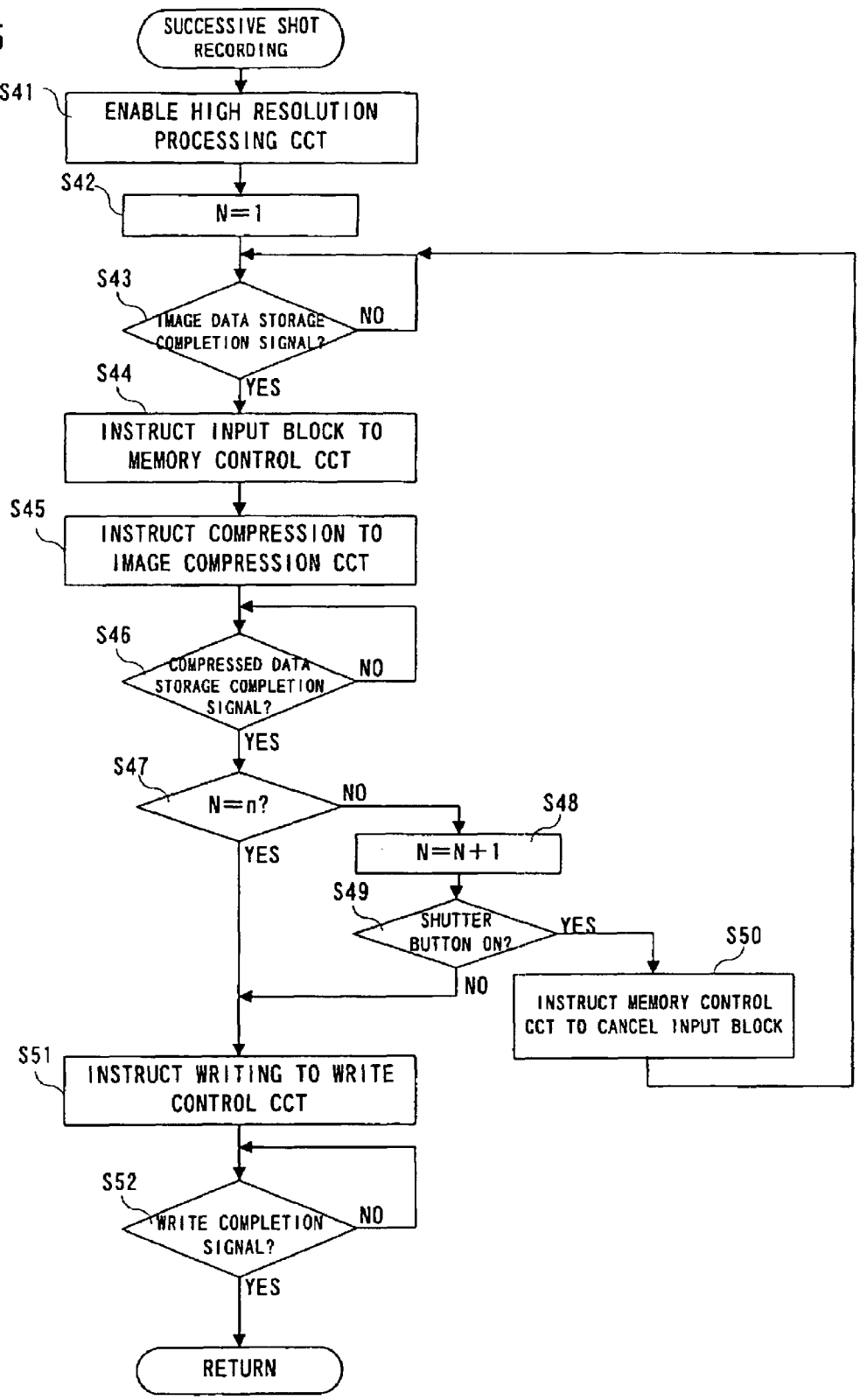
FIG. 5 is a flowchart showing further part of operation in the FIG. 1 embodiment.

On the other hand, when it is to be determined in step S10 that a successive shot recording mode is selected, the system controller 12 in step S12 processes a subroutine shown in FIG. 5. However, the operations in the successive shot recording mode are similar to those of the motion image recording mode, except in that in step S41 the high resolution signal processing circuit 4a is to be enabled, in step S44 an input blocking command is given to the memory control circuit 22, in step S47 the count value N is to be compared with a maximum shotable number n (n<m), in step S50 the process return to the step S43 after instructing to release the input blockage, and the write control circuit 13 accommodate a plurality of screens of compressed image data separately to a plurality of still image files. Hence, duplicated explanations are omitted.

In a successive shot recording mode, the high resolution signal processing circuit 4a is enabled in order to record high resolution image data. In order to effect successive shots at an interval, for example, of 0.2 second, an input block command is issued in response to an image data storage completion signal. Also, the maximum shotable no. is different between in the motion image recording mode and in the successive shot recording mode, because of the following reason.

That is, in the successive shot recording mode is dealt with high resolution image data, and accordingly, the amount of image data becomes great. The increase of data amount requires a longer time for processing by a image compression circuit 11 or write control circuit 13, correspondingly requiring a greater drive power to create 1-scene compressed image data. In this manner, the power required to process 1-scene image data in the successive shot recording mode is greater than that of the motion image recording mode. Hence, the maximum shotable no. in the successive shot recording mode is provided smaller than that of the motion image recording mode.

According to this embodiment, when the shutter button 16 is operated in the still image recording mode, the CCD imager 1 takes 1 scene of a subject image so that the signal processing circuit 4 creates a 1-scene image signal with high resolution. This 1-scene image signal is recorded in a compressed state into the memory card 14. When the battery remaining capacity goes below 5%, the system controller 12 causes the shutter button 16 to be disabled, and displays a character indicative of not-recordable on the monitor 9.

In the motion image recording mode, when shutter button 16 is operated, the CCD imager 1 takes subject images in number of m so that the signal processing circuit 4 creates m scenes of image signals with low resolution. These m-scenes image signals are recorded in a compressed state into the memory card 14. When the battery remaining capacity shows below 25%, the system controller 12 disables the shutter button 16 operation, and displays character indicative of not-recordable on the monitor 9.

In the successive shot recording mode, when the shutter button 16 is operated, the CCD imager 1 takes n (n<m) scenes of subject images so that the signal processing circuit 4 creates n scenes of image signals with high resolution. These n-scenes image signals are recorded in a compressed state onto the memory card 14. When the battery remaining capacity goes below 25%, the system controller 12 disables the shutter button 16 operation, and displays a character indicative of not-recordable on the monitor 9.

Here, the threshold value is used to determine whether the shutter button 16 should be disabled in operation or not, which value is determined based on the number of subject image scenes to be taken in a selected recording mode and a resolution related to selected recording mode. Therefore, the shot image can be properly recorded in any of the still image recording mode, the successive shot recording mode and the motion image recording mode. That is, it is possible to prevent such an event that the recording process be suspended due to running out of battery capacity in the course of writing compressed image data to the image memory 5 or in the course of recording the compressed image data stored to the image memory 5.

As well known, if the image file recorded in the memory card 14 is transferred to a personal computer and the compressed image data is decompressed by using predetermined software, the shot image will be reproduced on the display. As for a motion image file, motion images can be displayed on a display by reproducing each compressed image data at a predetermined time interval according to image nos. given to the header. Incidentally, it is needless to say that if such an image decompression function is provided on a camera main body, still motion images can be reproduced on the monitor 9.

In this embodiment, the resolution of image data was taken "VGA" for the still image or successive shot recording mode while the resolution of image data was "QVGA" for the motion image recording mode. Alternatively, it is possible for an operator to select, mode by mode, a desired one of a plurality of resolutions including "XGA" and "SVGA". In such a case, however, there is a need to determine a threshold and/or maximum shotable no. by considering a power to be consumed upon selecting a maximum resolution in each mode.

That is, if in a still image recording mode, there is a necessity to change the threshold value of 5% of the step S6 based on a power consumption required for recording one still image with a maximum resolution. On the other hand, in the successive shot image recording mode, there is a necessity to change the step S9 depending upon what % of a power consumption of the full charged capacity is required to record a maximum shotable number m, or still images in number of n, with a maximum resolution. Meanwhile, if the threshold value of 25% is to be used as it is, there is a necessity to provide maximum shotable no. that is changeable depending upon a maximum no. of still images to be continuously recorded with maximum resolution in each mode.

Meanwhile, if in the FIG. 1 block diagram the image memory 5 is configured by an SDRAM, data transfer through the bus 7 is usually made by DMA. Further, although explanation was made an image display on the monitor 9 to be necessarily executed upon turning on the power to the camera, a monitor on/off switch may be provided to allow for operator's selection. Furthermore, characters indicative of not-recordable may be displayed not only on the monitor 9 but on the remaining capacity indication section 21.

Furthermore, in this embodiment, different steps are proceeded through depending upon set recording mode so that the battery remaining capacity can be compared to a threshold in compliance with each recording mode. That is, the comparison between the battery remaining capacity and threshold are implemented by software. Alternatively, a comparator may be prepared that is configured by hardware to compare between a battery remaining capacity and a predetermined threshold. In such a case, the threshold set in the comparator is updated depending upon a recording mode.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera which is driven by a battery, comprising:

an imaging device for imaging an object;

a selector for selecting anyone of a first mode for recording one scene of image signal corresponding to an object image which is imaged by said imaging device and a second mode for recording a plurality of scenes of image signals corresponding to the object images which are imaged by said imaging device;

a recorder for recording to a recording medium the image signal(s) having the number of scenes corresponding to the mode selected by said selector;

a displayer for displaying a real-time motion image corresponding to the object images which are imaged by said imaging device during a time period that no recording process is performed by said recorder;

a determiner for determining whether or not a remaining amount of said battery is equal to or more than a threshold value corresponding to the mode selected by said selector out of a first threshold value corresponding to the first mode and a second threshold value corresponding to the second mode; and a controller for enabling said recorder when a determination result of said determiner is affirmative and disabling said recorder when the determination result of said determiner is negative, wherein said imaging device and said displayer are out of control of said controller.

2. An electronic camera according to claim 1, wherein the first threshold value corresponds to a consumption power required for recording the one scene of image signal, and the second threshold value corresponds to the consumption power required for recording the plurality of scenes of image signals.

3. An electronic camera according to claim 1, wherein said recorder includes a writer for writing to an internal memory the image signal corresponding to the object image, and a transferor for transferring the image signal stored in said internal memory to said recording medium.

4. An electronic camera according to claim 1, wherein the second mode includes a first resolution mode for recording M (M: integer more than one) scenes of the image signals each of which has a first resolution, and a second resolution mode for recording N (N: integer more than one and less than M) scenes of the image signals each of which has a second resolution higher than the first resolution.

5. An electronic camera according to claim 4, wherein the second threshold value has a common numerical value to the first resolution mode and the second resolution mode.

6. An electronic camera according to claim 1, further comprising an outputter for outputting a message indicative of not-recordable when the determination result of said determiner is negative.

7. An electronic camera according to claim 1, wherein said determiner performs a determining operation at a timing that a recording instruction is issued.

* * * * *